United States Patent
Ly et al.

(10) Patent No.: US 11,153,909 B2
(45) Date of Patent: Oct. 19, 2021

(54) TWO-STAGE CHIRP SIGNAL TRANSMISSION IN USER EQUIPMENT CENTRIC MOBILITY (UECM)

(71) Applicant: QUALCOMM Incorporated, San Diego, CA (US)

(72) Inventors: Hung Ly, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 15/604,285

(22) Filed: May 24, 2017

(65) Prior Publication Data
US 2017/0359840 A1 Dec. 14, 2017

Related U.S. Application Data

(60) Provisional application No. 62/347,204, filed on Jun. 8, 2016.

(51) Int. Cl.
*H04W 74/08* (2009.01)
*H04L 1/18* (2006.01)
(Continued)

(52) U.S. Cl.
CPC .......... *H04W 74/0833* (2013.01); *H04L 1/00* (2013.01); *H04L 1/1671* (2013.01);
(Continued)

(58) Field of Classification Search
None
See application file for complete search history.

(56) References Cited

U.S. PATENT DOCUMENTS 7,643,454 B2 * 1/2010 Guethaus ............ H04W 74/008
370/335
8,442,017 B2 * 5/2013 Lee ....................... H04W 52/50
370/338
(Continued)

FOREIGN PATENT DOCUMENTS

CN 201515499 U 6/2010
CN 101919298 A 12/2010
(Continued)

OTHER PUBLICATIONS

Partial International Search Report—PCT/US2017/034490—ISA/EPO—dated Jul. 26, 2017.
(Continued)

*Primary Examiner* — Kouroush Mohebbi
(74) *Attorney, Agent, or Firm* — Patterson + Sheridan, L.L.P.

(57) ABSTRACT

Aspects of the present disclosure provide a two-stage uplink transmission scheme. As described herein, a UE may transmit a first portion of an uplink signal to an AN, receive a first acknowledgment responsive to the first portion, and after receiving the first acknowledgement, transmit the first portion and a second portion of the uplink signal to the AN. The AN may receive a first portion of an uplink signal from UE, transmit a first acknowledgment responsive to the first portion, and after transmitting the acknowledgement, receive the first portion and a second portion of the uplink signal from the UE.

30 Claims, 9 Drawing Sheets

(51) Int. Cl.
- H04L 1/16 (2006.01)
- H04W 52/14 (2009.01)
- H04L 1/00 (2006.01)
- H04W 52/50 (2009.01)
- H04W 52/24 (2009.01)
- H04W 52/48 (2009.01)
- H04W 52/10 (2009.01)
- H04W 84/04 (2009.01)

(52) U.S. Cl.
CPC ......... H04L 1/1887 (2013.01); H04W 52/146 (2013.01); *H04L 1/0063* (2013.01); *H04W 52/10* (2013.01); *H04W 52/242* (2013.01); *H04W 52/245* (2013.01); *H04W 52/48* (2013.01); *H04W 52/50* (2013.01); *H04W 84/045* (2013.01)

(56) References Cited

U.S. PATENT DOCUMENTS

| | | | |
|---|---|---|---|
| 8,867,459 B2* | 10/2014 | Tujkovic | H04L 5/003 370/329 |
| 9,814,073 B2 | 11/2017 | Barbieri et al. | |
| 2003/0223452 A1* | 12/2003 | Toskala | H04W 52/50 370/442 |
| 2008/0095185 A1* | 4/2008 | DiGirolamo | H04W 72/085 370/464 |
| 2011/0182370 A1 | 7/2011 | Shi et al. | |
| 2015/0098418 A1 | 4/2015 | Vajapeyam et al. | |
| 2015/0319659 A1 | 11/2015 | Jung et al. | |
| 2016/0128006 A1 | 5/2016 | Ji et al. | |
| 2016/0270082 A1 | 9/2016 | Soriaga et al. | |
| 2016/0359591 A1 | 12/2016 | Yellapantula et al. | |
| 2017/0055192 A1 | 2/2017 | Johansson et al. | |
| 2017/0086221 A1* | 3/2017 | Jover | H04W 74/004 |

FOREIGN PATENT DOCUMENTS

| | | |
|---|---|---|
| CN | 101998607 A | 3/2011 |
| CN | 102271418 A | 12/2011 |
| WO | 2014120668 | 8/2014 |

OTHER PUBLICATIONS

Samsung: "Random Access Procedure in NR", 3GPP TSG-RAN WG2 Meeting #94, R2-163372, May 22, 2016, XP051104903, Retrieved from the Internet: URL:http://www.3gpp.org/ftp/Meetings_3GPP_SYNC/RAN2/Docs/, 7 pages.
Interdigital: "PRACH for NB-IoT", 3GPP Draft; R1-161918, 3rd Generation Partnership Project (3GPP), Mobile Competence Centre; 650, Route Des Lucioles; F-06921 Sophia-Antipolis Cedex; France, vol. RAN WG1, No. Sophia Antipolis, Mar. 16, 2016, XP051081035, Retrieved from the Internet: URL:http://www.3gpp.org/ftp/tsg_ran/WG1_RL1/TSGR1_AH/LTE_NB-IoT_1603/Docs/ [retrieved on Mar. 16, 2016], 2 pages.
International Search Report and Written Opinion—PCT/US2017/034490—ISA/EPO—dated Oct. 13, 2017.
Nokia et al., "Latency Reduction for Uplink Signalling Traffic", 3GPP Draft; R2-163349, 3rd Generation Partnership Project (3GPP), Mobile Competence Centre; 650, Route Des Lucioles; F-06921 Sophia-Antipolis Cedex; France, vol. RAN WG2. No. Nanjing, China; May 22, 2016, XP051104892, Retrieved from the Internet: URL:http://www.3gpp.org/ftp/Meetings_3GPP_SYNC/RAN2/Docs/ [retrieved on May 22, 2016], 5 pages.
NTT Docomo et al., "L1 eNB measurements on PRACH resources" 3GPP Draft; R1-080159 ENB Measurement—PRACH, 3rd Generation Partnership Project (3GPP), Mobile Competence Centre ; 650, Route Des Lucioles ; F-06921 Sophia-Antipolis Cedex ; France, vol. RAN WGI, No. Sevilla, Spain; Jan. 8, 2008, Jan. 8, 2008 (Jan. 8, 2008), XP050108689, 3 pages.
Rapporteur et al., "Email Discussion Report on DL Probe Procedure for Open Loop Power Control for FACH", 3GPP Draft; R1-010481, 3rd Generation Partnership Project (3GPP), Mobile Competence Centre; 650, Route Des Lucioles; F-06921 Sophia-Antipolis Cedex; France, vol. RAN WG1, No. Pusan, Korea; May 21, 2001, XP050595768, [retrieved on May 21, 2001], 5 pages.
Siemens: "Single Mechanism RACH Backoff Control", 3GPP Draft; R2-063200, 3rd Generation Partnership Project (3GPP), Mobile Competence Centre; 650, Route Des Lucioles; F-06921 Sophia-Antipolis Cedex; France, vol. RAN WG2, No. Riga, Latvia; Nov. 1, 2006, XP050132698, [retrieved on Nov. 1, 2006], 3 pages.

* cited by examiner

TWO-STAGE CHIRP SIGNAL TRANSMISSION IN USER EQUIPMENT CENTRIC MOBILITY (UECM)

CROSS-REFERENCE TO RELATED APPLICATIONS

This application claims priority to U.S. Provisional Application Ser. No. 62/347,204, entitled "TWO-STAGE CHIRP SIGNAL TRANSMISSION IN USER EQUIPMENT CENTRIC MOBILITY (UECM)," filed Jun. 8, 2016, which is expressly incorporated by reference herein in its entirety.

INTRODUCTION

The present disclosure generally relates to wireless communications and, more particularly, to a two-stage uplink ("chirp") signal transmission.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

Future generations of wireless communication may focus on user-centric networks. Accordingly, it may be desirable to have an efficient method for a user to efficiently and effectively transmit an uplink signal to an access network for accessing the network (e.g., random access request, on-demand system information request, etc.) and supporting mobility management. Similarly, it may be desirable for an access network to efficiently and effectively receive an uplink signal.

SUMMARY

Certain aspects of the present disclosure provide a method for wireless communication by a user equipment (UE). The method generally includes transmitting a first portion of an uplink signal to an access network (AN), receiving a first acknowledgment responsive to the first portion, and after receiving the acknowledgement, transmitting the first portion and a second portion of the uplink signal to the AN.

Certain aspects of the present disclosure provide an apparatus for wireless communication by a user equipment. The apparatus generally includes means for transmitting a first portion of an uplink signal to an access network (AN), means for receiving a first acknowledgment responsive to the first portion, and after receiving the acknowledgement, means for transmitting the first portion and a second portion of the uplink signal to the AN.

Certain aspects of the present disclosure provide an apparatus for wireless communication by a user equipment. The apparatus generally includes at least one processor and a memory coupled with the at least one processor. The at least one processor is generally configured to transmit a first portion of an uplink signal to an access network (AN), receive a first acknowledgment responsive to the first portion, and after receiving the acknowledgement, transmit the first portion and a second portion of the uplink signal to the AN.

Certain aspects of the present disclosure provide a computer readable medium storing computer executable code for causing a user equipment to transmit a first portion of an uplink signal to an access network (AN), receive a first acknowledgment responsive to the first portion, and after receiving the acknowledgement, transmit the first portion and a second portion of the uplink signal to the AN.

Certain aspects of the present disclosure provide a method for wireless communication by an access network (AN). The method generally includes receiving a first portion of an uplink signal from a user equipment (UE), transmitting a first acknowledgment responsive to the first portion, and after transmitting the acknowledgement, receiving the first portion and a second portion of the uplink signal from the UE.

Certain aspects of the present disclosure provide an apparatus for wireless communication by an access network (AN). The apparatus generally includes means for receiving a first portion of an uplink signal from a user equipment (UE), means for transmitting a first acknowledgment responsive to the first portion, and after transmitting the acknowledgement, means for receiving the first portion and a second portion of the uplink signal from the UE.

Certain aspects of the present disclosure provide an apparatus for wireless communication by an access network (AN). The apparatus generally includes at least one processor and a memory coupled with the at least one processor. The at least one processor is generally configured to receive a first portion of an uplink signal from a user equipment (UE), transmit a first acknowledgment responsive to the first portion, and after transmitting the acknowledgement, receive the first portion and a second portion of the uplink signal from the UE.

Certain aspects of the present disclosure provide a computer readable medium storing computer executable code for causing an access network (AN) to receive a first portion of an uplink signal from a user equipment (UE), transmit a first acknowledgment responsive to the first portion, and after transmitting the acknowledgement, receive the first portion and a second portion of the uplink signal from the UE.

Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
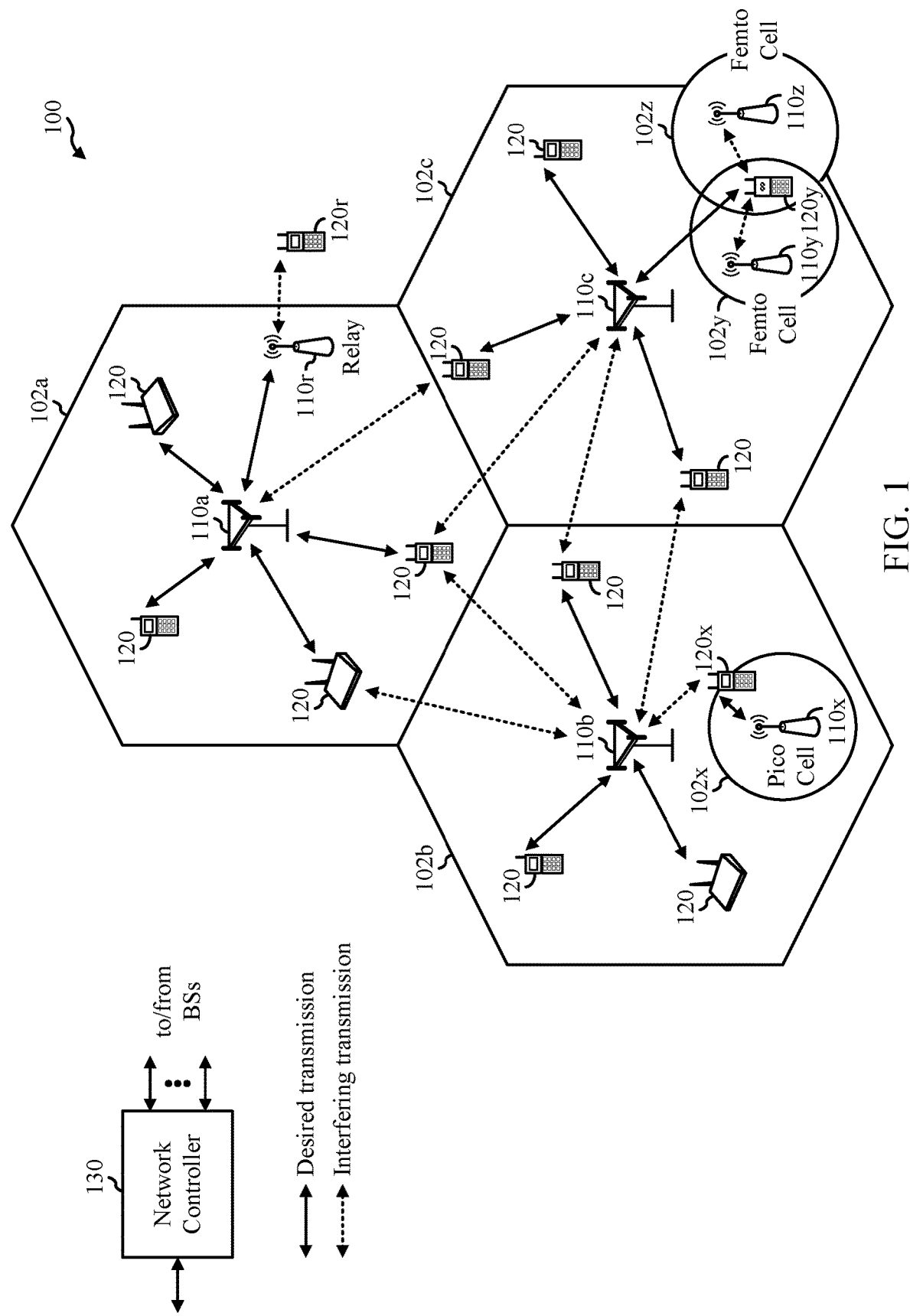
FIG. 1 is a block diagram conceptually illustrating an example telecommunications system, in accordance with certain aspects of the present disclosure.

Aspects of the present disclosure provide techniques and apparatus for a two-stage transmission for an uplink signal. As will be described in more detail herein, the two stage transmission for the uplink signal may include Stage 1 and Stage 2. Stage 2 begins after successfully completing Stage 1.

During Stage 1, a first portion of the uplink signal is transmitted. After successful completion of Stage 1, a user may begin Stage 2, wherein the first portion and a second portion of the uplink signal are transmitted. Stated otherwise, the first portion which was transmitted in Stage 1 is transmitted in addition to a second portion of the uplink signal.

The uplink signal may be referred to as a chirp signal, the first portion of the uplink signal may include a random access channel (RACH) sequence, and the second portion of the uplink signal may include a chirp message. In an effort to effectively set the power of the uplink signals in Stage 1, the first portion may be transmitted at a transmit power level set based on open loop power control (OLPC). After successful completion of Stage 1, the first portion and the second portion may be transmitted, in Stage 2, at a power level set based on a transmit power used at the end of Stage 1.

A user may receive an acknowledgment in response to the Stage 1 transmission and a separate acknowledgment in response to Stage 2 transmission. Aspects described herein allow a user to efficiently set a transmit power for the uplink signal and effectively resolve collisions (e.g., caused by multiple users transmitting the same RACH sequence).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software/firmware, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Aspects of the present disclosure may be used for new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless network 100 in which aspects of the present disclosure may be implemented. For example, the access network may be a new radio (NR) or 5G network.

Figure 2:
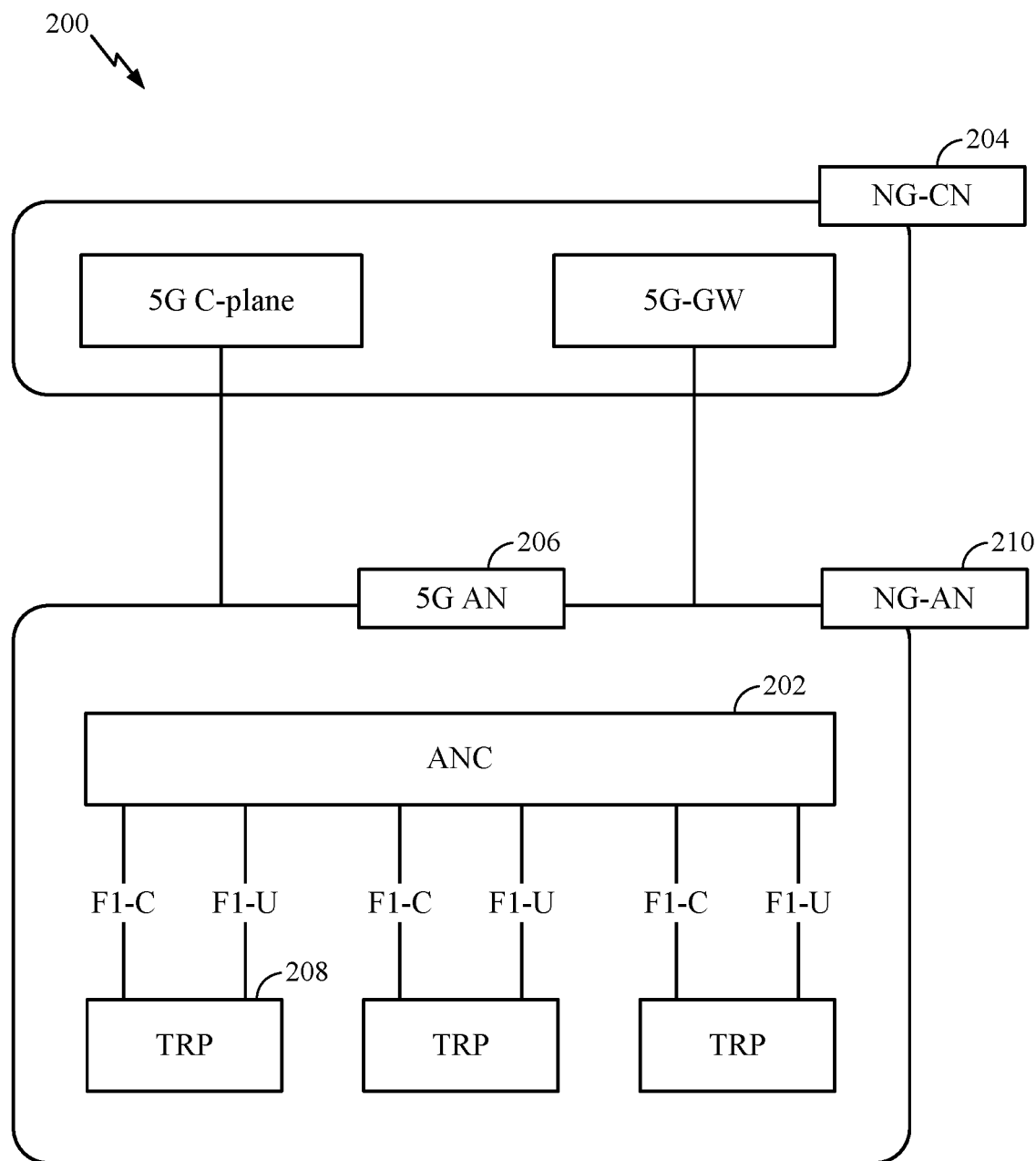
FIG. 2 is a block diagram illustrating an example logical architecture of a distributed RAN, in accordance with certain aspects of the present disclosure.

A UE 120 and access network 206 illustrated in FIG. 2 (including BS 110*a* and/or TRP 208) may implement aspects described herein. For example, the UE may transmit a first portion of an uplink signal to an AN, receive a first acknowledgment responsive to the first portion, and after receiving the acknowledgement, transmit the first portion and a second portion of the uplink signal to the AN.

The access network 206 may receive a first portion of an uplink signal from a UE 120, transmit a first acknowledgment responsive to the first portion, and after transmitting the acknowledgement, receive the first portion and a second portion of the uplink signal from the UE.

Figure 9:
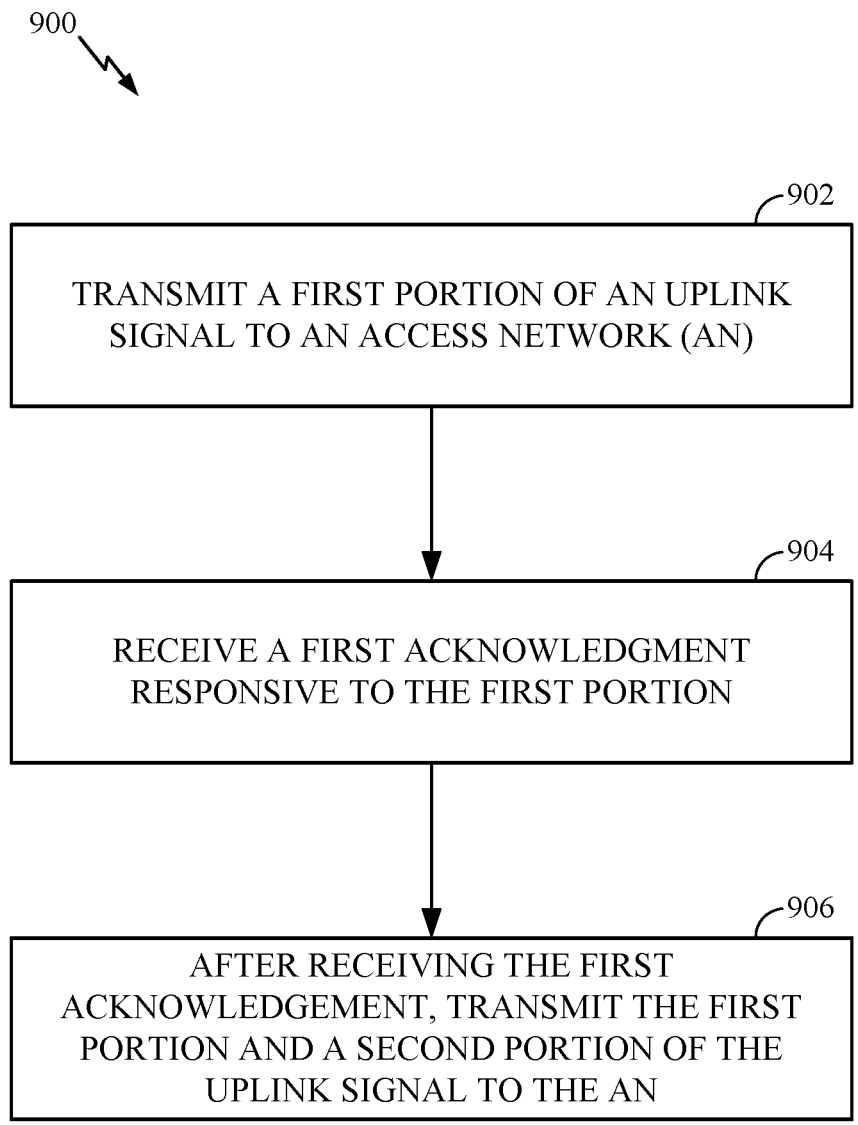
FIG. 9 illustrates example operations, performed by a UE, in accordance with certain aspects of the disclosure.
Figure 10:
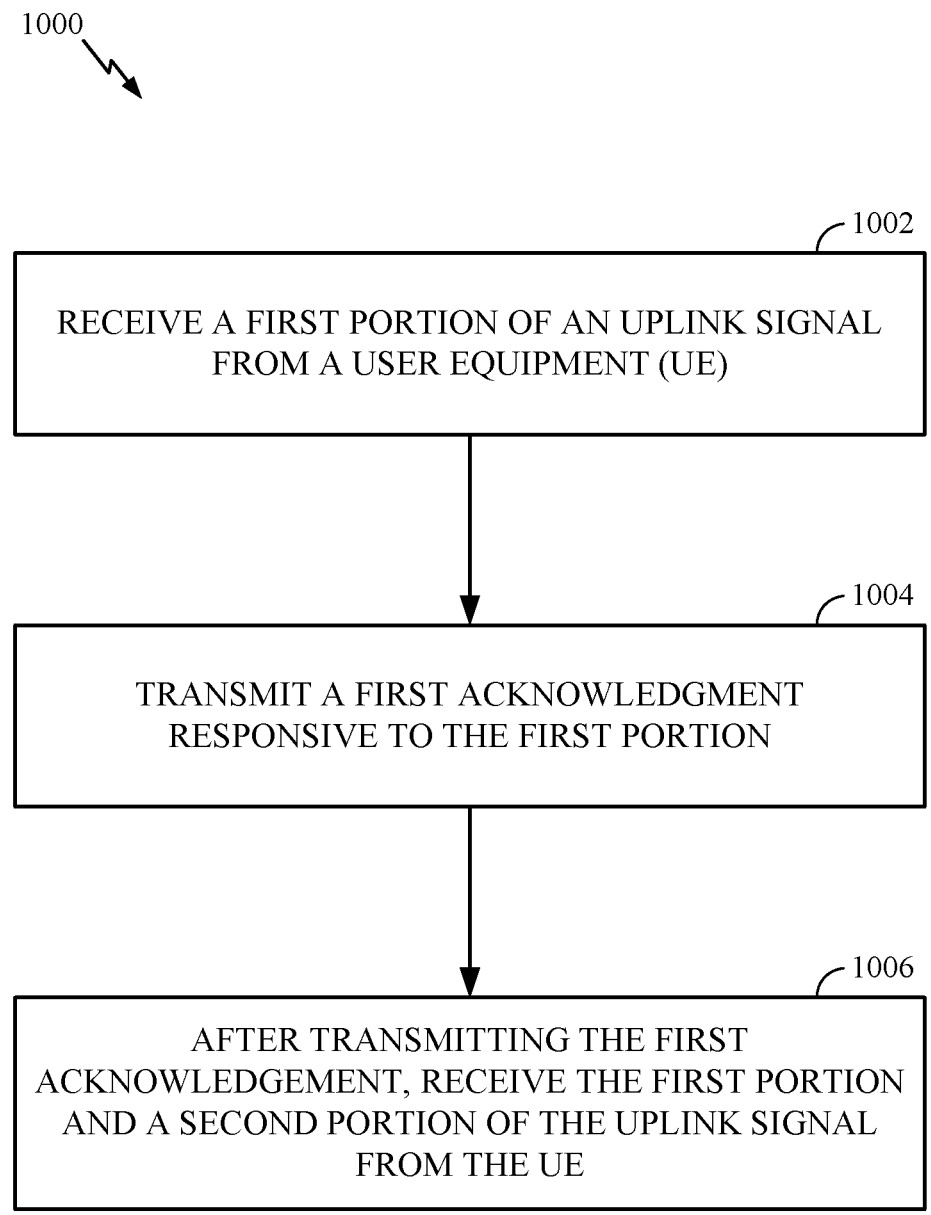
FIG. 10 illustrates example operations, performed by an access network (AN), in accordance with certain aspects of the disclosure.

The access network 206 including may be configured to perform operations 1000 illustrated in FIG. 10 and methods described herein for supporting a two-stage chirp transmission by a UE. The AN may include a BS 110, which may comprise a transmission gNB, reception point (TRP), Node B (NB), 5G NB, access point (AP), new radio (NR) BS, Master BS, primary BS, etc.). The NR network 100 may include the central unit. UE 120 may be configured to perform operations 900 illustrated in FIG. 9 and the methods described herein for a two-stage chirp transmission. The AN and UE may be configured to perform the operations illustrated in FIG. 8.

As illustrated in FIG. 1, the wireless network 100 may include a number of BSs 110 and other network entities (or network elements). According to an example, the network entities including the BS and UEs may communicate on high frequencies (e.g., >6 GHz) using beams. One or more BS may also communicate at a lower frequency (e.g., <6 GHz). The one or more BS configured to operate in a high frequency spectrum and the one or more BS configured to operate in a lower frequency spectrum may be co-located.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6a and 6b. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
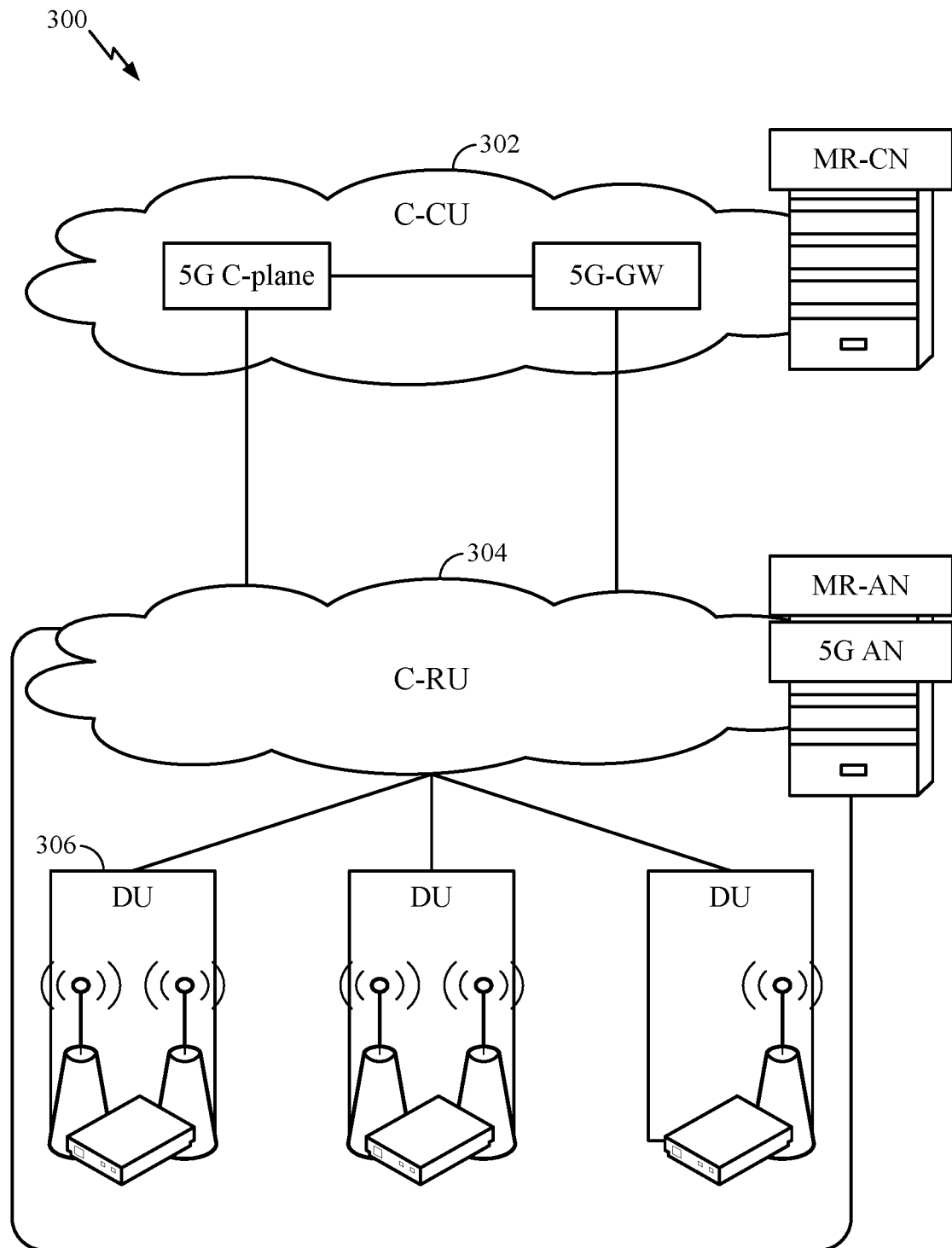
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
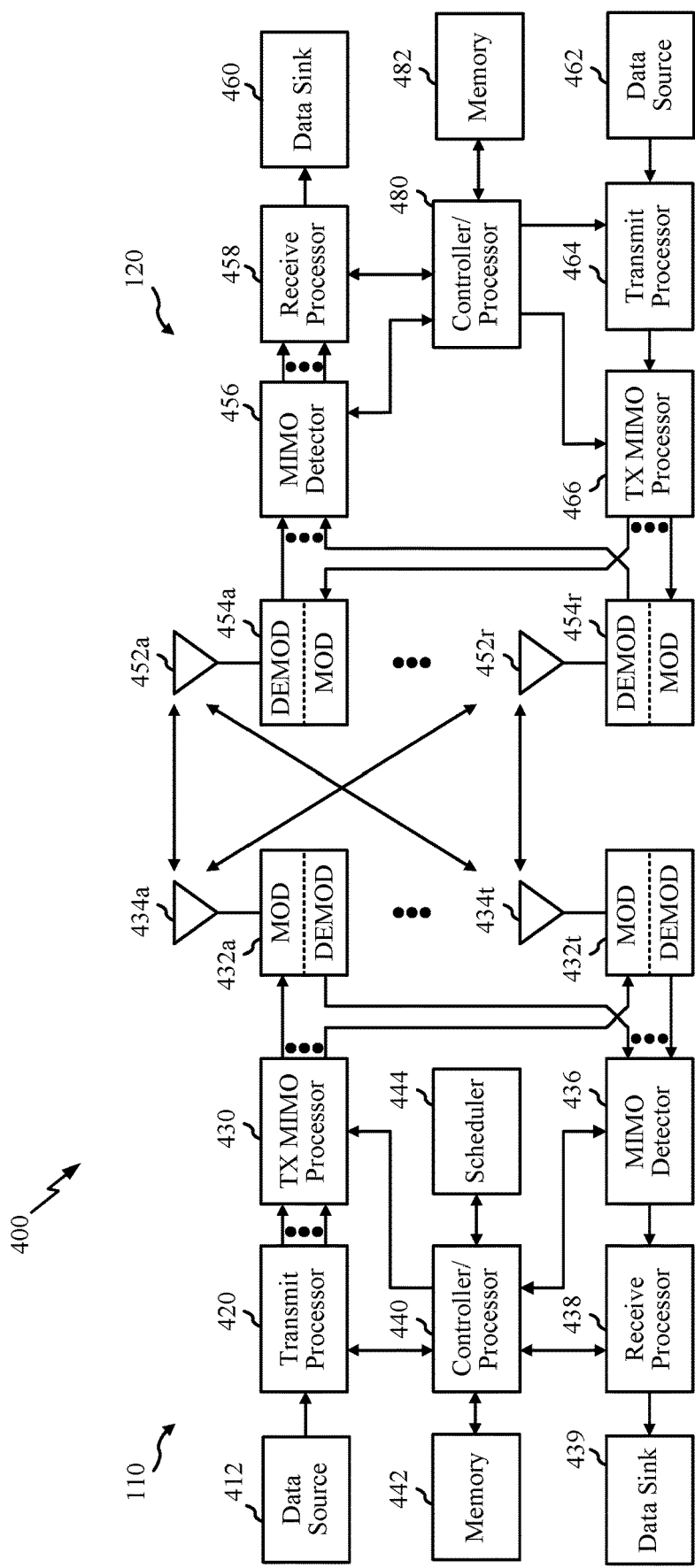
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, and 438, and/or controller/processor 440 of the BS 110 may perform the operations described herein and illustrated with reference to FIGS. 8-11.

As an example, one or more of the antenna 452, transceiver 454, controller/processor 480, and memory 482 of the UE 120 may be configured to transmit a first portion of an uplink signal to an AN, receive a first acknowledgment responsive to the first portion, and after receiving the acknowledgement, transmit the first portion and a second portion of the uplink signal to the AN.

As another example, one or more of the antenna 434, transceiver 432, controller/processor 440, and memory 442 of the BS 110 of an AN may be configured to receive a first portion of an uplink signal from a UE, transmit a first acknowledgment responsive to the first portion, and after transmitting the acknowledgement, receive the first portion and a second portion of the uplink signal from the UE.

For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 10, and/or other processes for the techniques described herein and those illustrated in the appended drawings. A scheduler 444 may schedule UEs for data transmission on the downlink and/or uplink. The processor 480 and/or other processors and modules at the UE 120 may perform or direct, e.g., the execution of the functional blocks illustrated in FIG. 9, and/or other processes for the techniques described herein and those illustrated in the appended drawings. The memories 442 and 482 may store data and program codes for the BS 110 and the UE 120, respectively.

Figure 5:
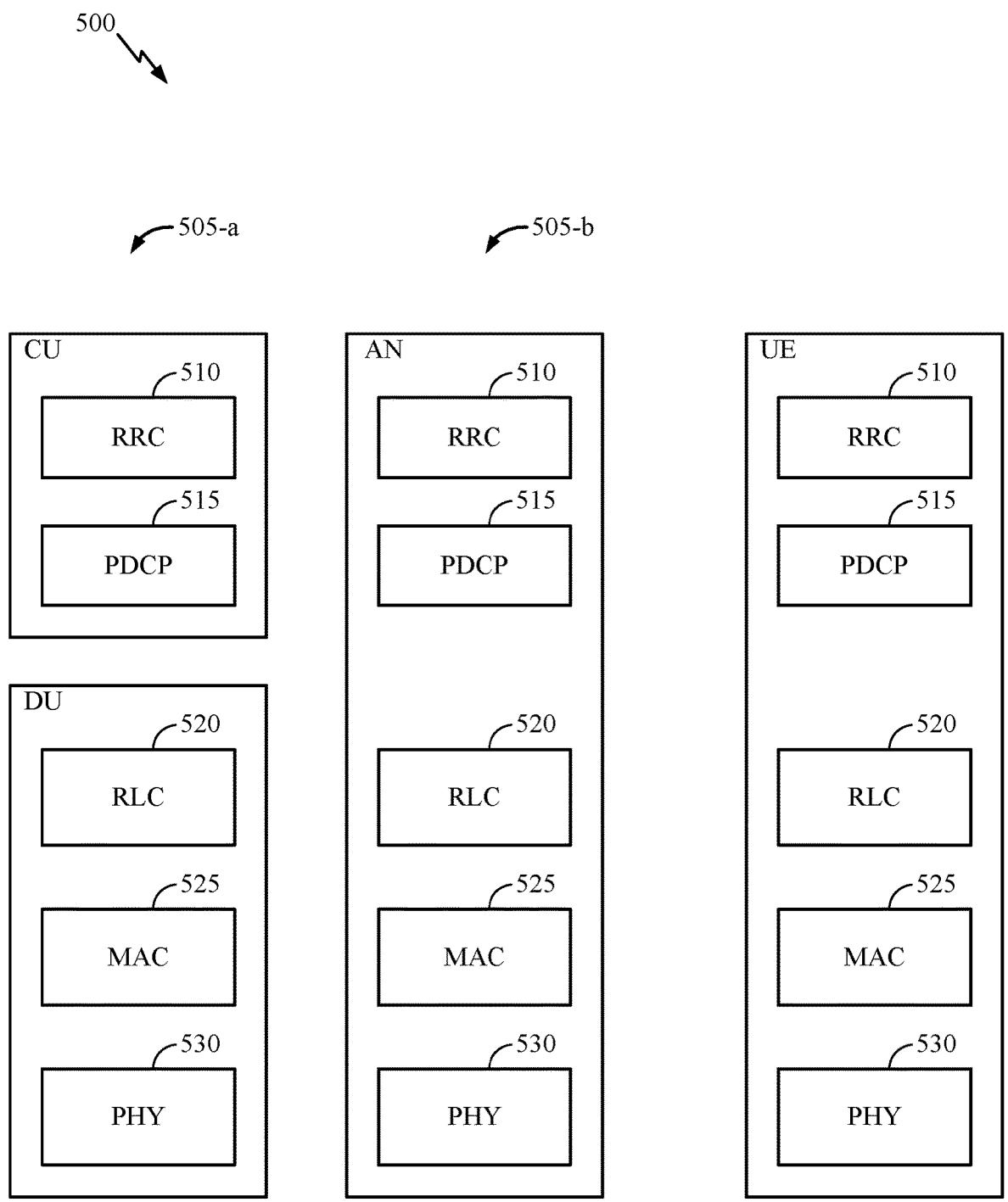
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6A:
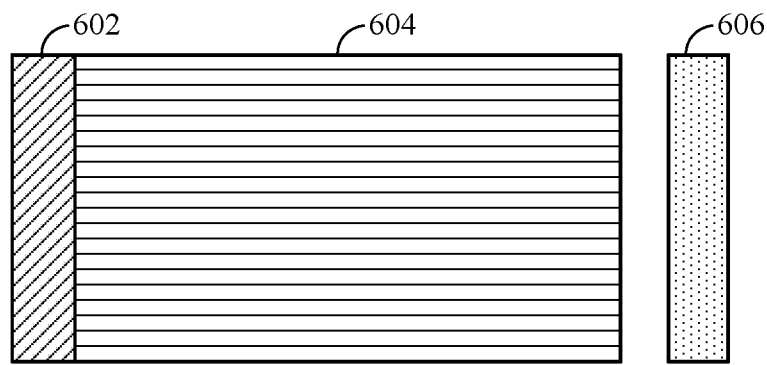
FIG. 6a illustrates an example of a DL-centric subframe, in accordance with certain aspects of the present disclosure.

FIG. 6a is a diagram 6a showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6a. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6a, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6B:
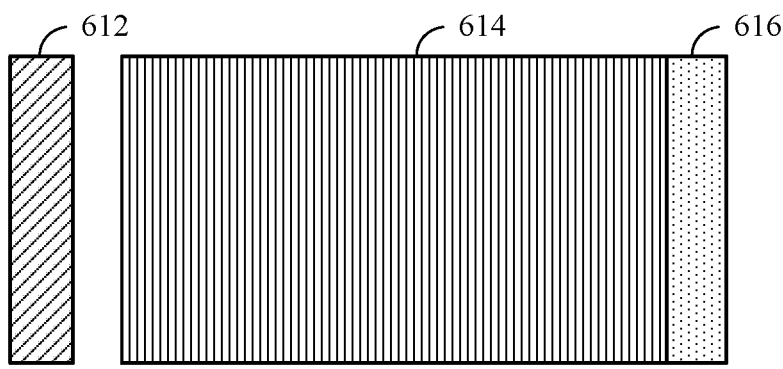
FIG. 6b illustrates an example of an UL-centric subframe, in accordance with certain aspects of the present disclosure.

FIG. 6b is a diagram 6b showing an example of an UL-centric subframe. The UL-centric subframe may include a control portion 612. The control portion 612 may exist in the initial or beginning portion of the UL-centric subframe. The control portion 612 in FIG. 6b may be similar to the control portion described above with reference to FIG. 6a. The UL-centric subframe may also include an UL data portion 614. The UL data portion 614 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 612 may be a physical DL control channel (PDCCH).

As illustrated in FIG. 6b, the end of the control portion 612 may be separated in time from the beginning of the UL data portion 614. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 616. The common UL portion 616 in FIG. 6b may be similar to the common UL portion 606 described above with reference to FIG. 6a. The common UL portion 616 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

Two-Stage Chirp Signal Transmission

Figure 7:
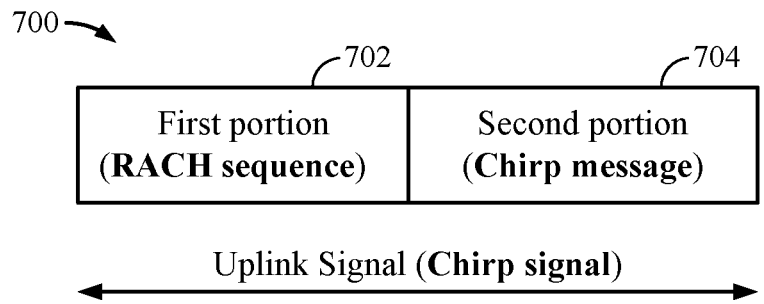
FIG. 7 illustrates an example uplink signal (e.g., chirp signal), in accordance with certain aspects of the present disclosure.

FIG. 7 illustrates an example uplink signal such as a chirp signal 700. In a user equipment centric mobility (UECM) system, such as a 5G wireless system, an uplink chirp signal may be used as a type of request by the UE to an access network (AN). For example, a UE transmit an uplink chirp signal 700 to request system information and/or initiate a random access procedure. The uplink chirp signal 700 may additionally or alternatively be used for (e.g., to support) support mobility management. The chirp signal 700 may include two portions: a first portion including a random access channel (RACH) sequence 702 and a second portion including an uplink signal message (e.g., chirp message) 704.

The RACH sequence 702 transmitted in the chirp signal 700 may be used by the AN to differentiate between multiple UEs using the same set of resource blocks to transmit the uplink signal (e.g., chirp signal). The RACH sequence 702 may also be used by the AN to estimate a channel for uplink signal message (e.g., chirp message) 704 decoding.

The chirp message 704 may be used to convey the transmitting UE's identification, chirp functionality, and/or supplemental information such as buffer status reporting (BSR), on-demand System Information Block (SIB) request bitmap, etc.

While FIG. 7 illustrates the RACH sequence 702 preceding the chirp message 704, the chirp message 704 may be transmitted before the RACH sequence 702 in the chirp signal 700. The chirp signal 700 may be transmitted such that the RACH sequence 702 is transmitted immediately following the chirp message 704.

A UE may randomly select a RACH sequence 702 from a finite set of sequences. RACH sequence collisions may occur if more than one UE transmits an identical RACH sequence over the same chirp resource blocks. Accordingly, having the chirp message 704 (e.g., chirp payload) transmitted together with RACH sequence 702 may not be efficient (e.g., because the AN may not correctly receive the chirp message, for example, due to RACH sequence collisions).

The transmit power for the UL chirp signal 700 may be set using open-loop power control (OLPC) by the UE. OLPC may not accurately set the transmit power for the chirp signal 700. For example, in a UECM system, nodes in an AN may transmit a same synchronization signal broadcasted in single-frequency network (SFN) mode. It may be difficult for the UE to estimate the power of a transmission from a specific node and set the UE's transmit power accordingly. Therefore, a UE may measure the received transmit power of signals received from one or more observable cells and/or more or more transmit/receive points (TRPs) within a zone. A zone may include multiple cells, and the cells within a zone may be synchronized (e.g., the cells may share the same timing).

The UE may, for example, use a median measured receive power or the mean measured receive power as the initial uplink transmit power for the chirp signal 700. According to another example, the UE may set the initial uplink transmit power based on a minimum measured receive power from a received synchronization signal. Regardless, due to the multiple nodes of the AN transmitting the synchronization signal, it may be difficult for the UE to measure power dynamics accurately. Accordingly, determining an uplink power based on OLPC may not be very efficient.

As described above, RACH sequence collision and OLPC inaccuracy may impact a chirp signal transmission. Therefore, a UE may have to transmit a RACH sequence 702 several times until the transmission is successfully received. Since an AN may not have received the RACH sequence, it may be inefficient for the UE to transmit the chirp message 704 in every chirp signal 700 transmission. Accordingly, aspects of the present disclosure provide methods to more efficiently transmit an uplink signal. Specifically, aspects described herein at least partially resolve the RACH sequence collision and achieve a good operating point for OLPC before sending chirp message 704.

Figure 8:
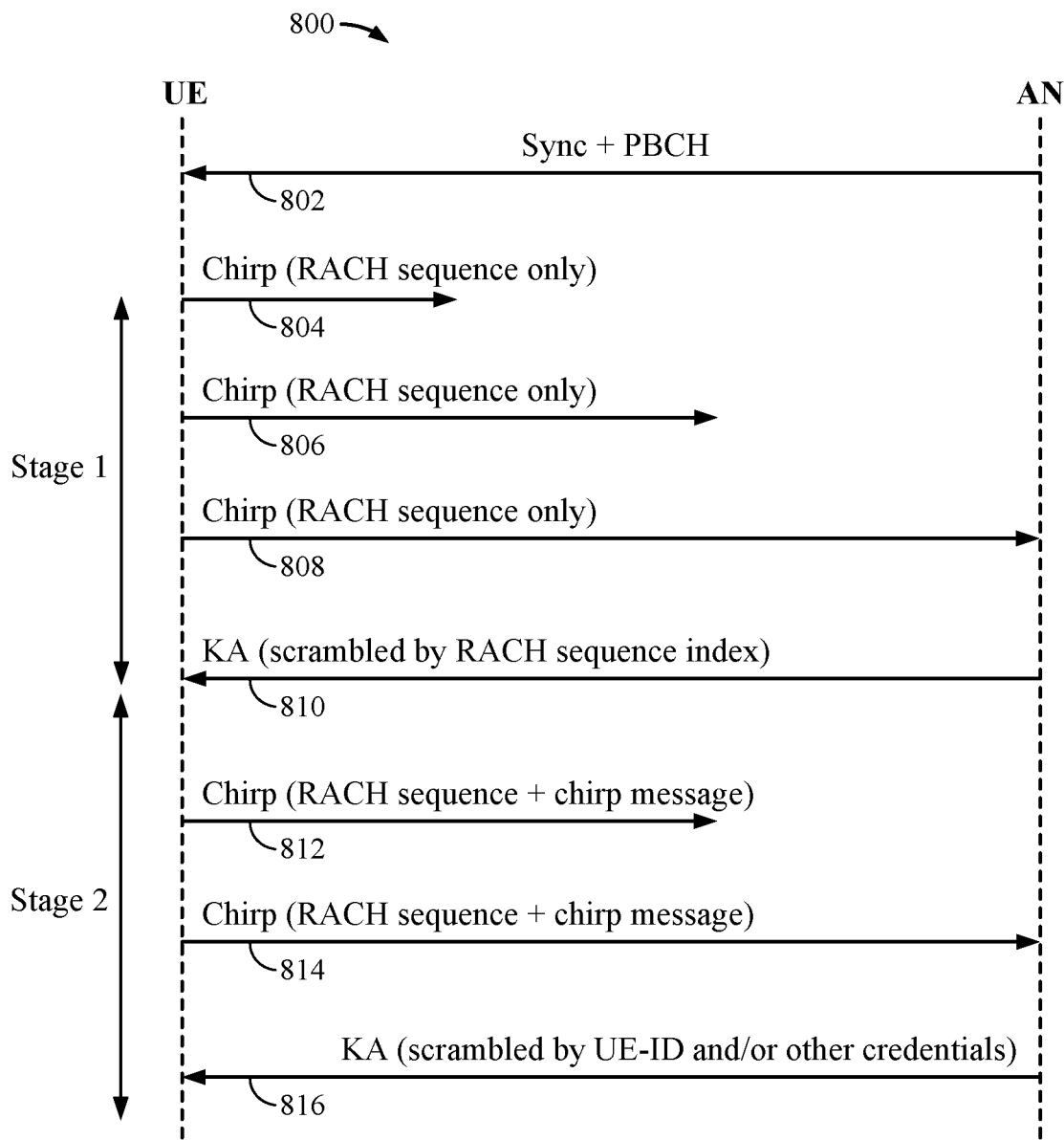
FIG. 8 illustrates an example two-stage transmission of an uplink signal, in accordance with certain aspects of the present disclosure.

FIG. 8 illustrates an example of a two-stage chirp signal transmission 800, in accordance with aspects of the present disclosure. Stage 1 of the two-stage transmission may be referred to as a carrier sensing and OLPC tuning stage. During Stage 1, the UE may transmit the first portion of the uplink signal (e.g., FIG. 7, 702) only. Stage 1 may, at least partially, handle RACH sequence collisions. Additionally, Stage 1 may determine an initial OLPC level which may be used in Stage 2.

After successful completion of Stage 1, the UE may move to Stage 2. Stage 2 of the two-stage transmission may be referred to as a message transmission stage. As will be described in more detail below, Stage 2 may occur after successful completion of Stage 1. During Stage 2, the UE may transmit the first portion and the second portion of the uplink signal. With reference to FIG. 7, during Stage 2, the UE may transmit both the RACH sequence 702 and chirp message 704. During Stage 2, a UE ID and/or other credentials may be used to further resolve RACH sequence collisions. As described above, the OLPC level determined from Stage 1 may be used in Stage 2.

At 802, the UE may synchronize with the AN and decode a master information block (MIB). The UE may perform a cell search to obtain timing and frequency synchronization to one or more cells in a zone. The UE may decode a physical broadcast channel (PBCH) in an effort to learn a configuration to use for the uplink chirp signal, which resources to use for the uplink chirp signal transmission and/or which RACH sequence to use and/or TRP power class.

During Stage 1, at 804, the UE may transmit the RACH sequence (and not the chirp message) using a transmit power level set based upon OLPC. The UE may compute the initial transmit power based on path-loss and a target received power (i.e., TRP power class) signaled in the MIB. A full compensation for pass-loss may be used in an effort to ensure that the received power of RACH sequence is independent of the path-loss. This may help the AN detect multiple, simultaneous RACH sequence transmission in a same resource block. The UE may measure the path-loss by measuring the power of a downlink reference signal such as a synchronization signal or a measurement reference signal (MRS). In a UECM system, at the chirp signal transmission stage, the UE may be able to measure the power of the single frequency network (SFN) synchronization signal due to SFN synchronization transmission. Accordingly, some margin may be applied to the path-loss computation in an effort to minimize interference to cells close by.

After transmitting the RACH sequence at 804, one of three scenarios (e.g., Cases) may occur.

In Case 1, the UE may receive a positive acknowledgment (e.g., a keep alive (KA)) message. After receiving a positive KA message, the UE may move to Stage 2.

In Case 2, the UE may receive a KA with a negative acknowledgment. A negative acknowledgment may indicate that the AN received the RACH sequence and that the UE may not have permission to transmit the chirp message. The UE may stop transmission and hand over control to a MAC layer. After a back-off period, the UE may regain access according to a MAC procedure (Carrier Sense Multiple Access (CSMA) based on persistence probabilities or P-persistent).

In Case 3, the UE may not receive a positive or negative KA. The UE may assume the AN did not receive the RACH sequence when it does not receive a KA, for example, after a predefined amount of time. Case 3 is illustrated in FIG. 8 and described in more detail below.

At 806, having not received an acknowledgment (e.g., a positive or negative acknowledgment) from the AN in response to the RACH sequence which was transmitted at 804, the UE may retransmit the RACH sequence at a higher transmit power level. At 808, having still not received an acknowledgment, the UE may again retransmit the RACH sequence at an even higher transmit power level. Steps 806-808 may be repeated until the UE transmits the RACH sequence a maximum number of times or until the UE receives a positive or negative acknowledgment in response to the RACH sequence. The UE may be configured with the maximum number of times a RACH sequence may be transmitted.

Increasing the power (power ramping) as shown in Steps 806-808 may be signaled in a MIB. After the UE transmits the RACH sequence a maximum number of times, it may stop transmission and hand over control to the MAC layer. After a back-off period, the UE may regain access according to a MAC procedure (e.g., CSMA access mode).

At 810, in response to receiving the RACH sequence transmitted at 808, the AN may transmit a positive acknowledgment, which may be referred to as a positive KA message. The positive KA message may be scrambled by the RACH sequence of the successfully received message from 808. The KA of Stage 1 may be broadcasted and scrambled by the RACH sequence.

Stage 2 may begin at 812, with the UE transmitting both the RACH sequence and chirp message. The UE may transmit the RACH sequence and chirp message using the same resource blocks used to successfully transmit the RACH sequence in Stage 1. The RACH sequence and chirp message may be transmitted using OLPC. According to aspects, the initial transmission of the RACH sequence and chirp message at 812 may be set based on the OLPC parameters used to successfully transmit the RACH sequence in Stage 1 (e.g., step 808 in FIG. 8).

After transmitting the RACH sequence and chirp message at 812, one of three scenarios (e.g., Cases) may occur.

In Case 1, the UE may receive a KA with a positive acknowledgment. The KA may indicate that the random access was successful and the UE may proceed with the next steps, such as PDCCH/PDSCH decoding.

In Case 2, the UE may receive a KA with a negative acknowledgment. The UE may stop this transmission and hand control back to the MAC layer. After a back-off period, the UE may regain access according to a MAC procedure (e.g., CSMA). Case 2 may be rare.

Case 3 may occur when the UE does not receive a positive or negative KA, for example, within a predefined amount of time. By not receiving a KA, the UE may assume the AN did not receive the RACH sequence and chirp message. Case 3 is illustrated in FIG. 8 and described in more detail below.

At 814, having not received an acknowledgment (from the AN in response to the RACH sequence and chirp message transmitted at 812), the UE may retransmit the RACH sequence and chirp message at a higher transmit power level. According to aspects, if the maximum number of RACH sequences is not exceeded (may be shared with Stage 1), the UE may transmit another RACH sequence and the chirp message by increasing the power using a power ramping step. The power ramping may be signaled in a MIB. The maximum number of RACH sequence transmissions may be set during a physical layer RACH procedure.

Accordingly, steps 812 and 814 may be repeated until the UE transmits the RACH sequence and the chirp message a maximum number of times or until the UE receives a positive or negative acknowledgment in response to the transmission.

At 816, the UE may receive an acknowledgment message from the AN in response to the successfully received RACH sequence and chirp message (from step 814). The acknowledgment message may be a KA message, which may be scrambled by the UE-ID and/or other credentials carried in the chirp message which the AN successfully received. As will be described in more detail below, the KA of Stage 2 may be a unicast transmission to the UE or, according to aspects, broadcast to the UE.

If the UE has transmitted the RACH sequence in Stage 2 a maximum number of times (wherein the maximum value may be shared with Stage 1), the UE may stop transmission, and hand over control to a MAC layer. After a back-off period, the UE may regain access according a MAC procedure (e.g., CSMA)

According to certain scenarios, two UEs may select and use the same RACH sequence in Stage 1. The AN may transmit a KA message scrambled by the RACH sequence. Both of the UEs may receive the KA message and proceed to Stage 2. According to the two-stage transmission described herein, the RACH sequence collision may be addressed in Stage 2. According to aspects, a unicast KA message scrambled by UE-ID and/or other UE-specific credentials may be transmitted responsive to receiving the RACH sequence and chirp message. Accordingly, due to Stage 1, the chance of collisions in Stage 2 may decrease.

According to aspects, the KA responsive to the received RACH sequence and chirp message may be broadcasted. For example, the acknowledgment in Stage 2 may be scrambled by common credentials. In response to an on-Demand SIB request, for example, the on-Demand SIB request bitmap may be used to scramble the acknowledgment. In high-speed mobility scenarios, a broadcasted acknowledgment in may be more efficient than a unicast acknowledgement. According to one high-speed mobility example, two UEs may be on a same high-speed train moving across zones in an AN. Both UEs may request a same on-Demand SIB request bitmap. In this scenario, a broadcasted acknowledgment may be more efficient for transmitting the on-demand SIB request bit map.

AN Processing

While a UE may know what it has transmitted to an AN (a RACH sequence or both a RACH sequence and chirp message), the AN may not know what the UE has transmitted. According to aspects, the AN may assume that the uplink chirp signal contains both the RACH sequence and the chirp message. The AN may first search for the RACH sequence and then decode the chirp message.

According to aspects, the AN may determine the uplink signal comprises the first portion based, at least in part, on a decoding a received RACH sequence. In response, the AN may use a RACH sequence index to scramble the first acknowledgment. As described herein, the first acknowledgment may be broadcasted, as more than one UE may have used a same RACH sequence.

According to aspects, the UE may attach a CRC to the chirp message. CRC detection may allow the AN to detect whether the chirp message (e.g., 704) exists or not (e.g., whether the UE transmitted just the RACH sequence or both the RACH sequence and the chirp message). The AN may apply a mechanism to trigger chirp message decoding. For example, the AN may trigger chirp message decoding if the AN detected the RACH sequence and used the RACH sequence to transmit the KA in Stage 1. Furthermore, the AN may use the RACH sequence to estimate the channel for chirp message decoding.

According to aspects, if a RACH sequence is detected and CRC passes, the AN may transmit KA scrambled by UE ID and/or other chirp functionality credentials. If the RACH sequence is detected and CRC fails, the AN may transmit a KA scrambled by the RACH sequence or RACH sequence identifier.

Contention Resolution

Stage 1 may partially resolve RACH sequence collisions. As described above, more than one UE may select and transmit an identical RACH sequence. The AN may detect the sequence and respond with a with KA (scrambled by RACH sequence signature identity). According to a first outcome, none of the transmitting UE may decode the KA. Accordingly, Stage 1 may continue for transmitting UEs. According to a second outcome, one or some of the transmitting UEs may decode the KA. The UEs which decoded the KA may move on to Stage 2, while the remaining, transmitting UEs may continue with Stage 1. According to a third outcome, all of the transmitting UE may decode the KA, and all of the UEs may move on to Stage 2.

Stage 2 may be used to resolve collisions from the second and third outcome described above. For example, the AN may detect a CRC attached to the chirp message. The CRC may be 8 bits and may be used in an effort to confirm chirp message detection. If the CRC passes, the AN may transmit a KA scrambled by UE ID (which the AN may determine based on a decoding the chirp message). If CRC does not pass, the AN may not transmit an acknowledgment, and the UEs may continue with Stage 2 of the two-stage transmission.

While certain aspects are described with reference to a CRC attached to the chirp message portion of the uplink signal, aspects of the present disclosure do not require a CRC. According to aspects, without a CRC, the AN may not be able to confirm if the decoded chirp message in Stage 2 is correct. If the decoded message is incorrect, the AN may obtain the wrong UE-ID and/or wrong chirp functionality. In response, the AN may transmit a KA to wrong UE (e.g., a UE that did not transmit the chirp message). In this scenario, the transmitting UE may continue to transmit the chirp message in Stage 2.

According to aspects, the AN may be agnostic to Stage 1 and Stage 2. The AN may detect the RACH sequence and attempt to decode the chirp message. Therefore, regardless of whether a UE is in Stage 1 or Stage 2, the AN may attempt to decode both the RACH sequence and the chirp message. Accordingly, a CRC may assist the AN to determine how to respond to the chirp signal.

FIG. 9 illustrates example operations 900 which may be performed by a UE, in accordance with aspects of the present disclosure. The operations 900 may be performed by one or more modules of UE 120.

At 902, the UE may transmit a first portion of an uplink signal to an AN. At 904, the UE may receive a first acknowledgment responsive to the first portion. At 906, after receiving the acknowledgement, the UE may transmit the first portion and a second portion of the uplink signal to the AN.

FIG. 10 illustrates example operations 1000 which may be performed by an AN. The AN may include one or more BS. The operations 1000 may be performed by one or more modules of BS 110.

At 1002, the AN/BS may receive a first portion of an uplink signal from a UE. At 1004, the AN/BS may transmit a first acknowledgment responsive to the first portion. At 1006, the AN/BS may, after transmitting the acknowledgement, receive the first portion and a second portion of the uplink signal from the UE.

As described herein, aspects of the present disclosure provide techniques and apparatus for a two-stage transmission for an uplink signal. In Stage 1, a first portion of an uplink signal is transmitted. After successful completion of Stage 1, a UE may begin Stage 2, wherein the first portion and a second portion of the uplink signal are transmitted.

As described herein, in Stage 1, first portion may be transmitted at a transmit power level set based on open loop power control. After successful completion of Stage 1, the first portion and the second portion may be transmitted, in Stage 2, at a power level set based on a transmit power used at the end of Stage 1. A UE may receive an acknowledgment in response to Stage 1 and a separate acknowledgment in response to Stage 2. Aspects described herein allow for a user to efficiently set a transmit power for the uplink signal and effectively resolve collisions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product/computer readable medium for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
   transmitting a random access channel (RACH) sequence to an access network (AN), using one or more resource blocks;
   receiving a first acknowledgment responsive to the RACH sequence, the first acknowledgement indicating that the RACH sequence was successfully transmitted using the one or more resource blocks; and
   after receiving the first acknowledgement, transmitting, using the one or more resource blocks, to the AN, an uplink signal comprising the RACH sequence and an uplink message.

2. The method of claim 1, wherein the RACH sequence is a RACH preamble sequence.

3. The method of claim 1, further comprising:
   appending a cyclic redundancy check (CRC) to the uplink message.

4. The method of claim 1, wherein the first acknowledgment responsive to the RACH sequence is scrambled by an index associated with the RACH sequence.

5. The method of claim 1, wherein transmitting the RACH sequence to the AN comprises:
   transmitting the RACH sequence at an initial transmit power level set based on open loop power control (OLPC) at the UE.

6. The method of claim 5, wherein the initial transmit power level set based on OLPC is based, at least in part, on a power measured from signals received by the UE from at least one of observable cells or transmit/receive points (TRPs) within a zone.

7. The method of claim 5, further comprising, when the UE has not received the first acknowledgment responsive to the RACH sequence:
   increasing the initial transmit power level; and retransmitting the RACH sequence at the increased transmit power level.

8. The method of claim 5, further comprising:
receiving a negative acknowledgement in response to the RACH sequence; and
in response to the negative acknowledgement, retransmitting the RACH sequence after a backoff period.

9. The method of claim 1, wherein the first acknowledgment responsive to the RACH sequence is broadcasted by the AN.

10. The method of claim 1, further comprising:
receiving a second acknowledgment, responsive to the transmitted uplink signal.

11. The method of claim 10, wherein the second acknowledgment is scrambled by at least one of an identifier associated with the UE or credentials transmitted in the uplink message.

12. The method of claim 10, wherein the second acknowledgment is received via at least one of a unicast transmission or a broadcast transmission.

13. The method of claim 1, wherein transmitting the uplink signal to the AN comprises:
transmitting the uplink signal using a first transmit power level based, at least in part, on a transmit power level of a most recently transmitted RACH sequence.

14. The method of claim 13, further comprising, when the UE has not received a second acknowledgment responsive to the transmitted uplink signal:
increasing the first transmit power level; and
retransmitting the uplink signal at the increased transmit power level.

15. The method of claim 1, further comprising:
receiving a negative acknowledgment responsive to the transmitted uplink signal; and
in response to the negative acknowledgment, retransmitting the uplink signal after a backoff period.

16. A method for wireless communication by an access network (AN), comprising:
receiving a random access channel (RACH) sequence from a user equipment (UE), using one or more resource blocks;
transmitting a first acknowledgment responsive to the RACH sequence, the first acknowledgement indicating that the RACH sequence was successfully transmitted using the one or more resource blocks; and
after transmitting the first acknowledgement, receiving, using the one or more resource blocks, from the UE, an uplink signal comprising the RACH sequence and an uplink message.

17. The method of claim 16, wherein the RACH sequence is a RACH preamble sequence.

18. The method of claim 16, further comprising:
determining the uplink signal comprises the RACH sequence based, at least in part, on decoding the received RACH sequence.

19. The method of claim 16, further comprising:
determining the uplink signal comprises the uplink message based, at least in part, on decoding a cyclic redundancy check (CRC) appended to the uplink message.

20. The method of claim 16, wherein the first acknowledgment responsive to the RACH sequence is scrambled by an index associated with the RACH sequence.

21. The method of claim 16, wherein the RACH sequence is transmitted at an initial transmit power level set based on open loop power control (OLPC) at the UE.

22. The method of claim 21, wherein the initial transmit power level set based on OLPC is based, at least in part, on a power measured from signals received by the UE from at least one of observable cells or transmit/receive points (TRPs) within a zone.

23. The method of claim 16, wherein the first acknowledgment responsive to the RACH sequence is broadcasted.

24. The method of claim 16, further comprising:
transmitting a second acknowledgment, responsive to the uplink signal.

25. The method of claim 24, wherein the second acknowledgment is scrambled by at least one of an identifier associated with the UE or credentials received in the uplink message.

26. The method of claim 24, wherein the second acknowledgment is transmitted via at least one of a unicast transmission or a broadcast transmission.

27. An apparatus for wireless communication, comprising:
means for transmitting a random access channel (RACH) sequence to an access network (AN), using one or more resource blocks;
means for receiving a first acknowledgment responsive to the RACH sequence, the first acknowledgement indicating that the RACH sequence was successfully transmitted using the one or more resource blocks; and
after receiving the first acknowledgement, means for transmitting, using the one or more resource blocks, to the AN, an uplink signal comprising the RACH sequence and an uplink message.

28. The apparatus of claim 27, wherein the means for transmitting the RACH sequence to the AN comprises:
means for transmitting the RACH sequence at an initial transmit power level set based on open loop power control (OLPC) at the UE.

29. An apparatus for wireless communication, comprising:
means for receiving a random access channel (RACH) sequence from a user equipment (UE), using one or more resource blocks;
means for transmitting a first acknowledgment responsive to the RACH sequence, the first acknowledgement indicating that the RACH sequence was successfully transmitted using the one or more resource blocks; and
after transmitting the first acknowledgement, means for receiving, using the one or more resource blocks, from the UE, an uplink signal comprising the RACH sequence and an uplink message.

30. The apparatus of claim 29, wherein the RACH sequence is a RACH preamble sequence.

* * * * *